(12) United States Patent
Pierschel

(10) Patent No.: US 10,359,243 B2
(45) Date of Patent: Jul. 23, 2019

(54) TRIPLE-FLOW HEAT EXCHANGER WITH INTEGRATED CONTROL VALVE

(71) Applicant: ZF Friedrichshafen AG, Friedrichshafen (DE)

(72) Inventor: Dennis Pierschel, Salem (DE)

(73) Assignee: ZF Friedrichshafen AG, Friedrichshafen (DE)

(*) Notice: Subject to any disclaimer, the term of this patent is extended or adjusted under 35 U.S.C. 154(b) by 0 days.

(21) Appl. No.: 15/969,870

(22) Filed: May 3, 2018

(65) Prior Publication Data
US 2018/0328679 A1 Nov. 15, 2018

(30) Foreign Application Priority Data
May 9, 2017 (DE) .................... 10 2017 207 807

(51) Int. Cl.
| F28F 27/02 | (2006.01) |
| F28D 9/00 | (2006.01) |
| F01M 5/00 | (2006.01) |
| F16H 57/04 | (2010.01) |
| F28D 21/00 | (2006.01) |

(52) U.S. Cl.
CPC ............. *F28F 27/02* (2013.01); *F01M 5/00* (2013.01); *F16H 57/04* (2013.01); *F28D 9/005* (2013.01); *F28D 9/0093* (2013.01); *F28D 2021/0089* (2013.01)

(58) Field of Classification Search
CPC .. F28F 27/02; F28D 9/005; F28D 2021/0089; F01M 5/005; F01M 5/007; F16K 11/065; F16H 57/04
See application file for complete search history.

(56) References Cited

U.S. PATENT DOCUMENTS

| 2,301,665 A | * | 11/1942 | Dykeman | .............. F01M 5/005 165/283 |
| 5,950,715 A | * | 9/1999 | Jonsson | ................. F28D 9/005 165/103 |
| 9,239,195 B2 | | 1/2016 | Kim et al. | |

(Continued)

FOREIGN PATENT DOCUMENTS

| DE | 197 12 599 A1 | 10/1998 | |
| DE | 102010033125 A1 | * 2/2012 | ............. F01M 5/002 |
| DE | 10 2011 057 190 A1 | 10/2012 | |

OTHER PUBLICATIONS

German Search Report Corresponding to 10 2017 207 807.3 dated Oct. 16, 2017.

*Primary Examiner* — Tho V Duong
(74) *Attorney, Agent, or Firm* — Davis & Bujold PLLC; Michael J. Bujold

(57) ABSTRACT

A heat exchanger (20) has at least two connections (58, 62) for the inflow of operating media. In a first of the connections (62), an insert (68) is provided for distributing the operating media to two different zones (22, 26) of the heat exchanger (20). In the insert (68) is arranged a valve (70), which can be actuated by the operating medium flowing in via one of the connections (62) and which, in a closed position, the valve (70) separates the different zones (22, 26) of the heat exchanger (20), whereas in a not-closed position, the valve (70) eliminates the separation between the different zones (22, 26) of the heat exchanger (20).

3 Claims, 3 Drawing Sheets

(56) References Cited

U.S. PATENT DOCUMENTS

| | | | |
|---|---|---|---|
| 2005/0199381 A1* | 9/2005 | Mercz | F16K 1/222 165/172 |
| 2006/0076129 A1* | 4/2006 | Eliades | F28F 27/02 165/297 |
| 2013/0160972 A1* | 6/2013 | Sheppard | F28F 27/00 165/96 |
| 2015/0101781 A1* | 4/2015 | Kim | F01P 3/12 165/96 |
| 2016/0109194 A1* | 4/2016 | Kato | F01P 7/165 165/100 |

* cited by examiner

TRIPLE-FLOW HEAT EXCHANGER WITH INTEGRATED CONTROL VALVE

This application claims priority from German patent application serial no. 10 2017 207 807.3 filed May 9, 2017.

FIELD OF THE INVENTION

The invention relates to a heat exchanger and an operating medium circuit containing a heat exchanger of that type.

BACKGROUND OF THE INVENTION

In liquid operating media in vehicles, heat generated for example by virtue of an energy transformation is given up to a coolant in a heat exchanger so that the utility of the operating medium is maintained and the operating medium remains available for further energy uptake.

Operating media of this type can be lubricants in motors or transmissions, which are heated due to the movement of the components present, or an oil or the water of a hydrodynamic braking device may be concerned, which converts the kinetic energy of the vehicle with the help of blading into heat which is transferred to the operating medium.

Heat exchangers are often designed as shell structures in which a plurality of similar shells are attached over one another and to one another, for example by brazing, which then form passages which respectively carry a coolant and an operating medium to be cooled past one another.

If in a vehicle there are several operating media to be cooled, then either several heat exchangers can be provided, in one of which in each case an operating medium is cooled by a coolant, or more than one operating medium can be cooled in a common heat exchanger, and in that case the heat exchanger has several zones each of which can come into contact with one coolant for the transfer of heat. Such heat exchangers are also known as multi-flow heat exchangers. For example a coolant circuit, a transmission oil circuit and a retarder oil circuit can be connected to a triple-flow heat exchanger.

The separation of the circuits and the guiding of the respective operating media into their associated passages of the heat exchanger take place by way of a tube, particularly a brazed tube, attached between a connection flange and the passages, along the length of which the distribution of the number of passages between the respective operating media can be varied.

Such a multi-flow heat exchanger is known from DE 197 12 599 A1 in which a plurality of oil feeds are provided, each of which is fed into fixed associated passages in order to come into contact with coolants also fed into the heat exchanger for heat transfer.

When operating media should only be used in certain operating conditions of the vehicle and in a particular operating condition only one operating medium should be cooled whereas another operating medium needs no cooling because the other operating medium in the operating condition concerned is not subjected to heat generation stress, then by means of a switching valve the operating medium circuit can be designed so that only the one operating medium flows through all the passages of the heat exchanger, while in the operating condition the other operating medium is not passed though the heat exchanger. The passages assigned to respective operating media during separate cooling are, in the operating condition, connected together for the operating medium to be cooled.

Such switching valves are structurally complex and when connected into the operating medium circuit give rise to high pressure losses.

SUMMARY OF THE INVENTION

The purpose of the present invention is to reduce the complexity and the losses in the operating medium guiding.

These objectives are achieved by a heat exchanger having the characteristics specified in the independent claims, and by the connection of such a heat exchanger into an operating medium circuit having the characteristics specified in the independent claims. Embodiments are the object of the subordinate claims.

A heat exchanger has at least two connections, provided for the inflow of operating medium and to which, for example in a vehicle, specific aggregates in an operating medium circuit are connected. To be able to separate the operating media from one another in different zones, in one of the connections an insert is provided for distributing the operating media to different zones of the heat exchanger. These different zones are usually in the form of passages in plates above one another, between which coolant is in each case passed.

According to the invention, in the insert a valve is provided, which can be actuated to a closed and a not-closed position. This actuation takes place by an operating medium flowing into the connection. In the closed condition of the valve a separation of the different zones of the heat exchanger is brought about, so that no exchange of operating media can take place between the different zones. In the not-closed condition the separation of the different zones of the heat exchanger is eliminated so that an operating medium can make its way into both zones and can therefore come into contact with the coolant over a much greater surface area in a larger number of passages.

In an advantageous design of the invention a valve slide is provided, which has a surface exposed to the pressure of the operating medium at the connection with the insert comprising the valve. The pressure of the operating medium, which actuates the valve, acts upon the valve slide so that the valve slide in pushed to a closed position of the valve. In the closed position the respective passages in which the operating media are present are therefore separated from one another in such manner that an operating medium is available for cooling, completely independently of the cooling of the other operating medium.

An alternative advantageous design of the invention provides a valve slide with a surface which is exposed to the volume flow of the operating medium at the connection having the insert with the valve. The volume flow of the operating medium, which actuates the valve, acts upon the valve slide so that the valve slide is moved to a closed position of the valve. In this design too, in the closed position of the valve the respective passages in which the operating media are present are separated from one another in such manner that an operating medium is available for cooling completely independently of the cooling of the other operating medium.

A further embodiment provides that the valve slide is pressed by a spring element toward the not-closed position in opposition to the pressure or volume flow exerted by the operating medium. Thus, when the pressure or volume flow of operating medium is relieved, the pressure of the spring element prevails and the valve slide moves to the not-closed position.

Preferably, in the insert which comprises the valve and is present in one of the connections, openings are provided which enable a connection of the zones of the heat exchanger. Through the openings an exchange between zones otherwise separated from one another can take place, so that an operating medium can also flow through passages which, in a closed position of the valve, cannot be reached by the operating medium.

The valve slide is preferably so designed that it has flat faces which, in the closed position of the valve, close off the openings in the insert. The faces form for example the outer circumference of the valve slide, which can be of circular shape. Then the insert with the openings is also circular and the faces come into contact with the openings, in such manner that in the closed condition of the valve the faces cover the openings, while in the not-closed condition the faces leave the openings partially or completely clear. In that way, with an uncomplicated design of the valve a reliable separation of zones and passages in the common heat exchanger can be achieved. Preferably such a heat exchanger is built into a vehicle, where it serves to cool a first operating medium, for example the transmission oil. Likewise this heat exchanger cools the operating medium of a hydrodynamic retarder provided in the vehicle as a wear-free permanent brake. The two operating media can than be fed to the common heat exchanger by way of the operating medium circuit of the vehicle.

Such an operating medium circuit of a vehicle then has a zone of a heat exchanger for cooling an operating medium of a transmission of the vehicle, and a zone of the heat exchanger for cooling the operating medium of a hydrodynamic retarder of the vehicle. According to the invention, the two zones are arranged together in a heat exchanger having a valve which, in a first operating condition of the vehicle, separates the two zones of the heat exchanger from one another so that the two operating media are cooled separately in their respective zones of the heat exchanger, whereas in a second operating condition of the vehicle a parallel connection of the zones of the heat exchanger is produced so that one of the operating media is cooled in both zones of the heat exchanger. In such an operating medium circuit the heat exchanger according to the invention can be used optimally for cooling the operating media according to need. The control of the circuit is simplified and there is no need for a complex and expensive control valve. Besides avoiding the higher cost of such a valve, the pressure losses are also reduced thanks to shorter and more simple flow-path layouts in the operating medium circuit.

In an advantageous embodiment of such an operating medium circuit, the valve can be brought by one of the operating media to a closed position in which the two zones of the heat exchanger are separated and the two operating media are cooled separately in their respective zones of the heat exchanger. The operating medium actuates the valve and thus determines which parts of the heat exchanger are available for cooling an operating medium.

By fitting the heat exchanger according to the invention in a correspondingly designed operating medium circuit, in an appropriate operating condition the complete heat exchanger can be used for cooling one operating medium. For example, this operating condition is reached if there is no demand for retarder braking and the operating medium of the retarder is not heated during a braking process. In another operating condition the same heat exchanger can be used for cooling more than one operating medium. Such an operating condition is reached, for example, when the retarder is actuated and its operating medium is heated during the braking process. A switching valve actuated during the braking process can be designed much more simply. Pressure losses are reduced, because the flow-paths of the operating media to be cooled in the vehicle can be made shorter.

BRIEF DESCRIPTION OF THE DRAWINGS

The invention will now be described in greater detail with reference to a drawing, which shows.

DETAILED DESCRIPTION OF THE PREFERRED EMBODIMENTS

Figure 1:
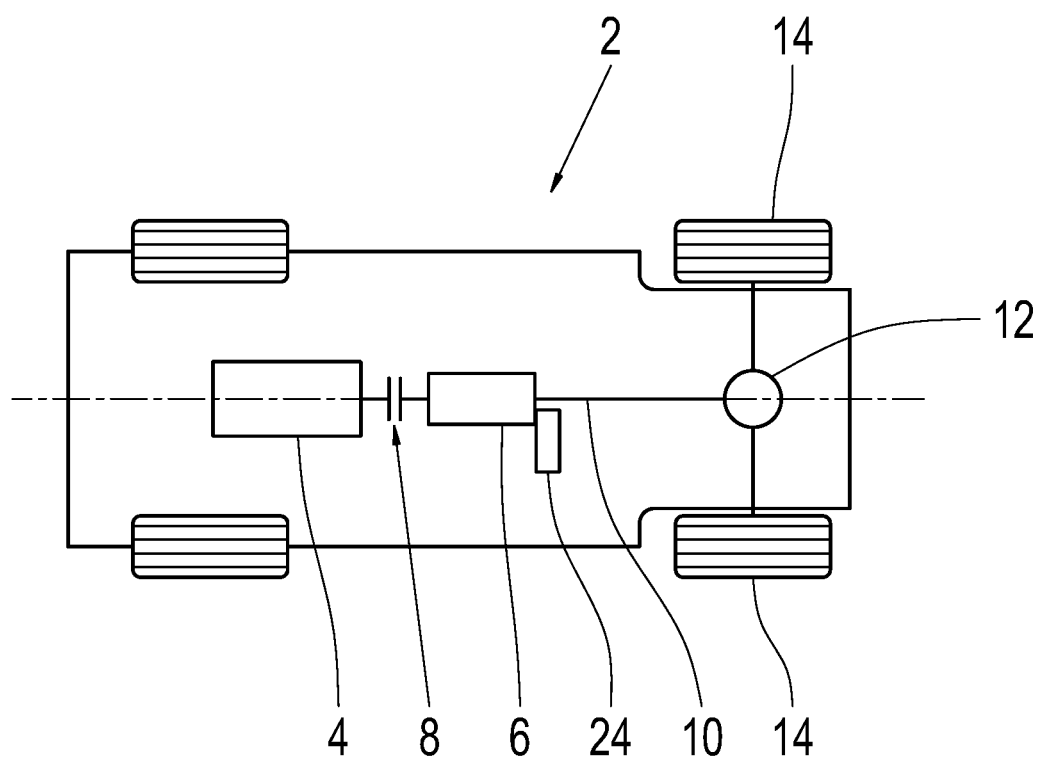
FIG. 1: A schematic representation of a vehicle

FIG. 1 shows a schematic representation of a vehicle 2, with a dive motor 4, a transmission 6 and a clutch 8 arranged between the drive motor 4 and the transmission 6. Here, instead of the clutch a torque converter can obviously be arranged. The transmission 6 is connected to the two rear wheels 14, via a drive output shaft 10, and a differential 12. A hydrodynamic retarder 24 is arranged on the transmission 6. In this case the retarder 24 is in the form of a secondary retarder on the drive output side. A primary retarder positioned on the input side could also be built onto the transmission 6.

Figure 2:
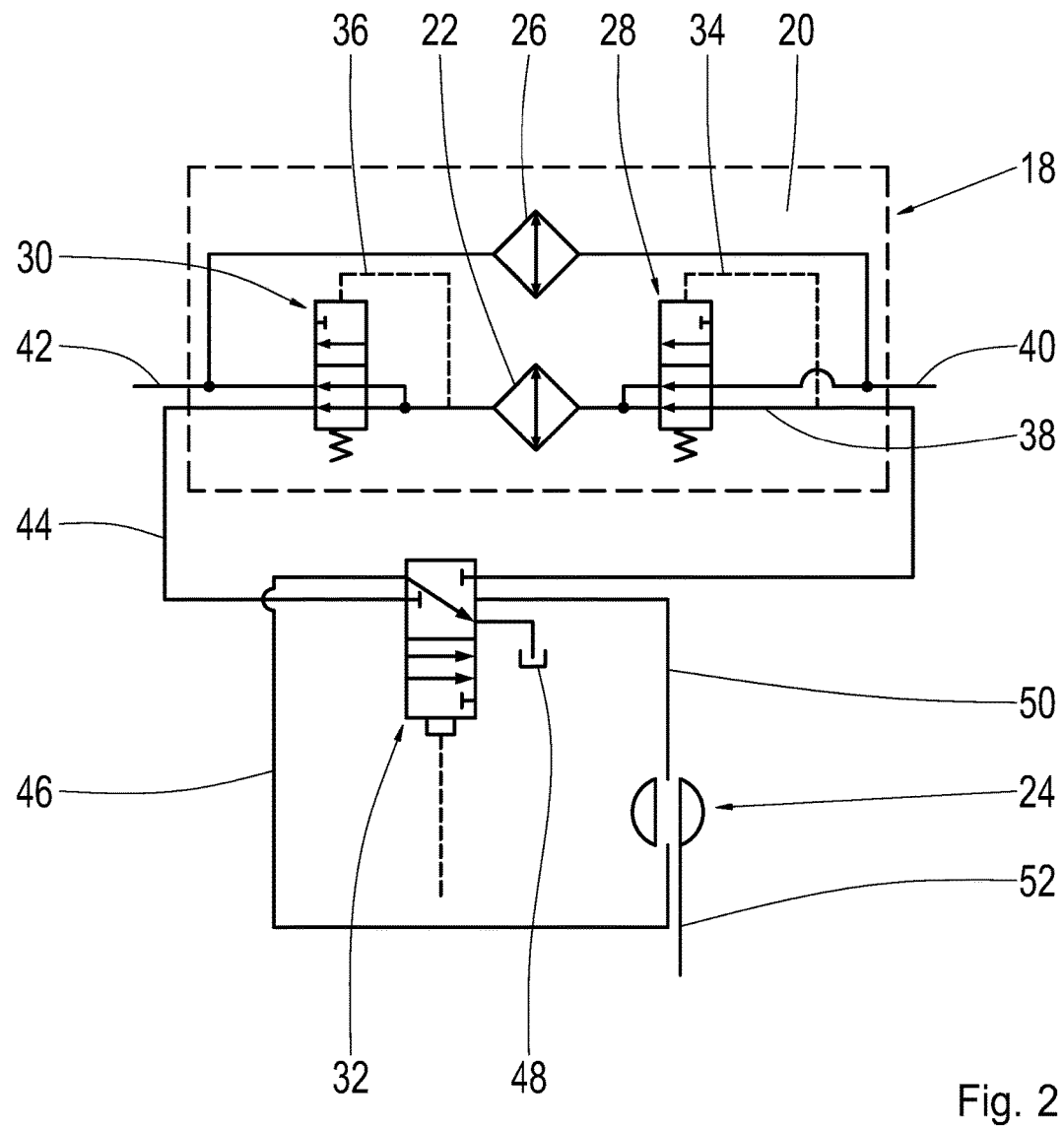
FIG. 2: A section of an operating medium circuit according to the invention

FIG. 2 shows a section of an operating medium circuit 18 of the vehicle 2. Of the operating medium circuit 18, the figure shows a heat exchanger 20 consisting of two zones. A first zone 22 serves to cool an oil which is the operating medium of a hydrodynamic retarder 24. A second zone 26 serves to cool an oil which is the operating medium of the transmission 6. In the operating medium circuit 18 there are three valves, of which one valve 28 and one valve 30 are inside the heat exchanger 20. The third valve 32 relates to the control of the retarder 24 and controls the flow of the operating medium of the retarder 24 in various operating conditions of the vehicle 2.

The two valves 28 and 30 each have two connections and two possible positions. Both valves 28 and 30 are controlled by respective control lines 34 and 36, each connected to a line 38 for the operating medium of the retarder 24, which leads the operating medium through the zone 22 of the heat exchanger 20. Together with a line 40 the line 38 runs to the connections of the valve 28. The line 40 carries the operating medium of the transmission 6. In this case the line 40 on the one hand runs to the valve 28 and on the other hand also leads the operating medium of the transmission 6 to be cooled through the zone 26 of the heat exchanger 20. In a first switch position of the valve 28 a connection is established between the line 40 and the line 38, so that in this first position of the valve 28 the operating medium passing through the line 40 can flow both through the first zone 22 and through the second zone 26 of the heat exchanger 20, and is therefore cooled in both areas. In the second position of the valve 28 the line 40 is closed in the direction of the zone 22 of the heat exchanger 20 and passage is only possible through the line 38. This second position of the valve 28 is always controlled via the line 34 when in the line 38 there is a pressure or a volume flow high enough to move the valve 28 to that position.

The valve 30 too is controlled by the pressure or volume flow in the line 38 and, depending on these, opens the line 42 at low values to drain the operating medium that has flowed through the zone 22 back into the transmission 6. At high values the switch position of the valve 30 allows the operating medium that has flowed through the zone 22 to pass via the line 44 toward the valve 32.

The valve 32 is controlled as a function of the retarder operation. In a first driving situation, which is illustrated in FIG. 2, the retarder is not activated and the residual operating medium remaining in the retarder passes through the line 46 via the valve 32 into the transmission sump 48. The line 44 is blocked in the valve 32. Likewise, the valve 32 blocks the line 38 in the direction of the valve 28. A flow of operating medium via a line 50 into the retarder is also prevented by the valve 32.

When the retarder 24 is activated manually or by a control unit, operating medium is delivered via a line 52 into the working space of the retarder 24. The valve 32 is moved to its second position. Accordingly, operating medium heated in the retarder 24 can be passed via the line 46 into the line 38. The pressure now existing in the line 38 changes the valve 28 in such manner that only the line 38 is connected to the zone 22 of the heat exchanger 20. Likewise, due to the pressure the valve 30 is moved in such manner that only the now cooled operating medium from the zone 22 of the heat exchanger 20 flows into the line 44 and on into the line 50, and can flow back to the retarder 24 for further use.

Figure 3:
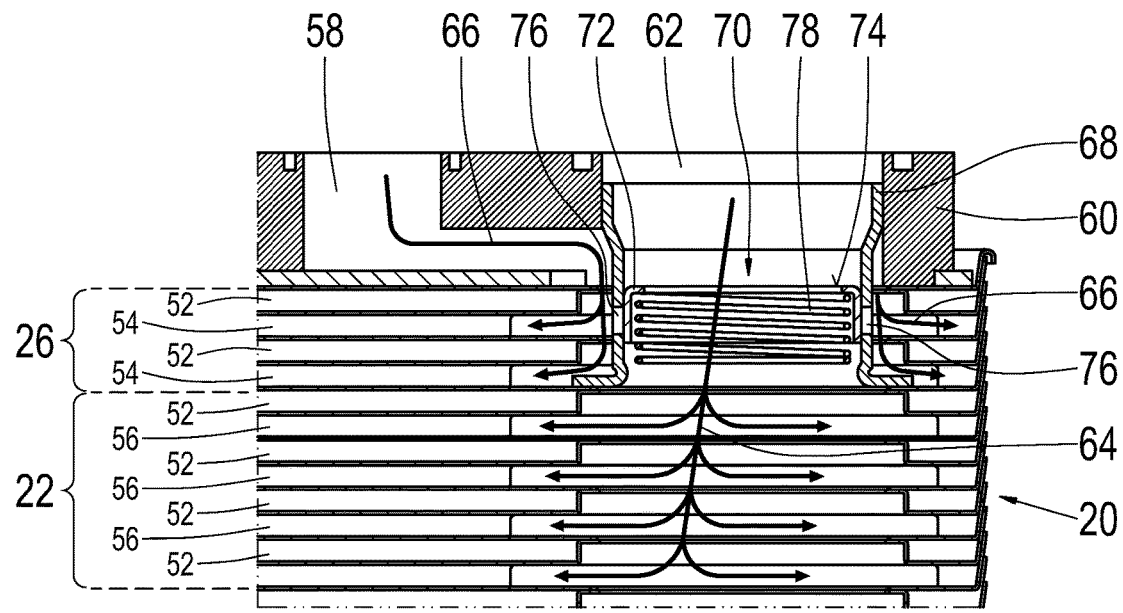
FIG. 3: A first section through a heat exchanger according to the invention

FIG. 3 shows a section of a heat exchanger 20 according to the invention, which is designed in a known manner as a plate heat exchanger in which a plurality of passages provided in plates are connected to an adaptor plate 60 and brazed together. In this case passages 52 carrying a coolant are always in heat-exchanging contact with passages 54 or 56 through which an operating medium is flowing. Through the connection 58 oil, as the operating medium of the transmission 6, flows into the passages 54 of one zone 26 of the heat exchanger 20. This is shown by the arrows 66.

Through the connection 62 the operating medium of the retarder 24 flows into the passages 56 of the other zone 22 of the heat exchanger 20, as shown by the arrow 64. In the adapter plate, in the connection 62 is positioned an insert 68 which comprises a valve 70. For this, inside the circular insert 68 there is an also circular valve slide 72 which can be pushed up and down in the plane of the drawing. In the view shown in FIG. 3 the outer side surfaces 82 (see FIG. 4) of the valve slide 72 closes off openings 76 in the insert 68. These openings 76 enable an exchange between the connections 58 and 62, and thus also between the passages 54 and 56.

In FIG. 3, as shown, the valve slide 72 is pushed to the position where it closes off the openings 76. This happens due to the action upon the surface 74 of the valve slide 72, of the pressure of the operating medium of the retarder 24 flowing past the connection 62. In the arrangement shown in FIG. 3 that pressure is high, so that the valve slide 72 is pressed downward against the opposing pressure of a valve spring 78 and the openings 76 are closed off.

Figure 4:
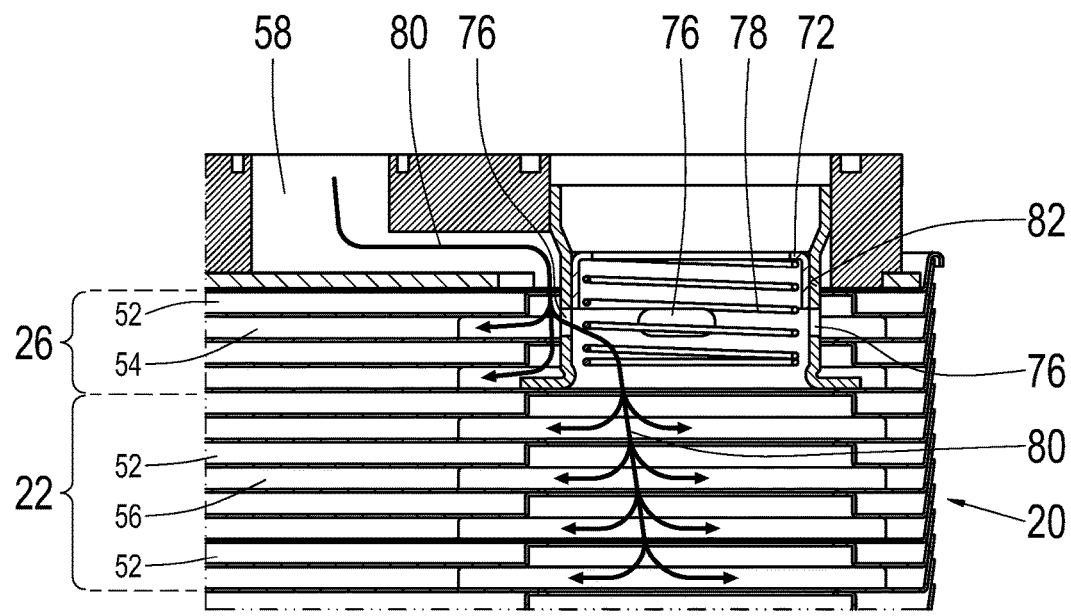
FIG. 4: The section of FIG. 3 in a different operating condition

In contrast, in FIG. 4 the pressure of the operating medium of the retarder 24 is low because the retarder is not actuated, so the valve spring 78 can push the valve slide 72 upward in the plane of the drawing and the openings 76 are left clear. Through the connection 58 the operating medium of the transmission 6 flows into the passages 54 of one zone 26 and into the passages 56 of the other zone 22 of the heat exchanger 20. This is shown by the arrow 80. Consequently, all the passages of the heat exchanger 20 can be used for cooling the operating medium of the transmission 6 flowing in through the connection 58.

INDEXES

2 Motor vehicle
4 Drive motor
6 Transmission
8 Clutch
10 Drive output shaft
12 Differential
14 Rear wheel
18 Operating medium circuit
20 Heat exchanger
22 Zone
24 Retarder
26 Zone
28 Valve
30 Valve
32 Valve
34 Control line
36 Control line
38 Line
40 Line
42 Line
44 Line
46 Line
48 Transmission sump
50 Line
52 Line
54 Passage
56 Passage
58 Connection
60 Adapter plate
62 Connection
64 Arrow
66 Arrow
68 Insert
70 Valve
72 Valve slide
74 Surface
76 Opening
78 Valve spring
80 Arrow
82 Side surface

The invention claimed is:

1. An operating medium circuit, for a vehicle, having a first zone of a heat exchanger for cooling an operating medium of a transmission of the vehicle and a second zone of the heat exchanger for cooling an operating medium of a hydrodynamic retarder of the vehicle,
    the first and the second zones being arranged together in a heat exchanger which has a valve that:
        in a first operating condition of the vehicle, separating the first and the second zones of the heat exchanger from one another so that the two operating media are cooled separately in the respective first and the second zones of the heat exchanger, and
        in a second operating condition of the vehicle, establishing a parallel connection between the first and the second zones of the heat exchanger so that one of the operating media is cooled in both of the first and the second zones of the heat exchanger.

2. The operating medium circuit according to claim 1, wherein the valve is changeable to a closed position, by one of the operating media, in which the first and the second zones of the heat exchanger are separated and the two operating media are cooled separately in the respective first and the second zones of the heat exchanger.

3. A heat exchanger comprising:
a first connection through which a first flow of operating medium is conducted into the heat exchanger and a second connection through which a second flow of operating medium is conducted into the heat exchanger;
an insert being arranged within the second connection for directing the first and the second flows of the operating medium to first and second cooling zones of the heat exchanger;
a valve being arranged within the insert, the valve being actuatable between a closed position and an unclosed position based on either a pressure or a volume of the second flow of operating medium through the second connection;
when the valve is in the closed position, the valve directs the first flow of operating medium from the first connection into the second cooling zone of the heat exchanger and directs the second flow of operating medium from the second connection into the first cooling zone of the heat exchanger; and
when the valve is in the unclosed position, the valve directs the first flow of operating medium from the first connection into the first and the second cooling zones of the heat exchanger.

* * * * *